(12) United States Patent
Kim

(10) Patent No.: US 7,747,722 B2
(45) Date of Patent: Jun. 29, 2010

(54) DEVICE MANAGEMENT METHOD FOR DEVICE MANAGEMENT SYSTEM

(75) Inventor: Te-Hyun Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1103 days.

(21) Appl. No.: 11/150,318

(22) Filed: Jun. 10, 2005

(65) Prior Publication Data

US 2005/0289229 A1 Dec. 29, 2005

(30) Foreign Application Priority Data

Jun. 11, 2004 (KR) .................. 10-2004-0043212

(51) Int. Cl.
*G06F 15/173* (2006.01)
*G06F 17/00* (2006.01)

(52) U.S. Cl. .................. 709/223; 707/100
(58) Field of Classification Search ............... 709/204, 709/220–228, 201, 209; 370/270, 465, 477, 370/351–358; 310/26–28; 707/102, 100; 719/316; 717/172, 177, 178; 379/201, 101, 379/88–79
See application file for complete search history.

(56) References Cited

U.S. PATENT DOCUMENTS

| 6,631,407 | B1 | 10/2003 | Mukaiyama et al. | |
|---|---|---|---|---|
| 7,269,602 | B2* | 9/2007 | Kaappa | 707/104.1 |
| 2002/0116479 | A1* | 8/2002 | Ishida et al. | 709/220 |
| 2003/0028639 | A1* | 2/2003 | Yamamoto et al. | 709/225 |
| 2005/0010585 | A1* | 1/2005 | Sahinoja et al. | 707/100 |
| 2005/0177591 | A1* | 8/2005 | Kanda et al. | 707/102 |
| 2005/0261977 | A1* | 11/2005 | Kiji et al. | 705/26 |
| 2006/0154649 | A1* | 7/2006 | Pedersen et al. | 455/412.1 |

FOREIGN PATENT DOCUMENTS

| JP | 11-164121 | 6/1999 |
|---|---|---|
| JP | 2000347975 | 12/2000 |
| JP | 2002-049500 | 2/2002 |
| JP | 2003-122635 | 4/2003 |
| JP | 2003122635 | 4/2003 |
| JP | 2003-316667 | 11/2003 |
| JP | 2004-062441 | 2/2004 |
| JP | 2004-062443 | 2/2004 |
| JP | 2004-078565 | 3/2004 |
| JP | 2004-151849 | 5/2004 |

\* cited by examiner

*Primary Examiner*—Nathan Flynn
*Assistant Examiner*—Mark O Afolabi
(74) *Attorney, Agent, or Firm*—Lee, Hong, Degerman, Kang & Waimey

(57) ABSTRACT

A device management method allows a device management client to actively request device management from a device management server with respect to an event occurring in a terminal by defining a step in which the device management client determines the device management server from which device management is requested with respect to a specific management object and a step in which the device management server efficiently processes the request of the device management client.

7 Claims, 7 Drawing Sheets

DEVICE MANAGEMENT METHOD FOR DEVICE MANAGEMENT SYSTEM

CROSS REFERENCE TO RELATED APPLICATIONS

Pursuant to 35 U.S.C. §119(a), this application claims the benefit of earlier filing date and right of priority to Korean Application No. 10-2004-43212, filed on Jun. 11, 2004, the contents of which are hereby incorporated by reference herein in their entirety.

BACKGROUND OF THE INVENTION

1. Field of the Invention

The present invention relates to a remote device management, and particularly, to a method allowing a client to perform a device management by actively requesting management of a specific management object to a server.

2. Description of the Background Art

In general, a device management allows a third party to set up or modify a configuration of a device by remotely controlling a value of variables or an objects which is stored in the specific device.

A device management method in accordance with the related art to support the device management is basically performed in such a manner that a device management server sends a command concerning a management object existing in a device and a device management client performs the command of the device management server.

However, the related art device management method does not sufficiently define or teach a method that the device management client actively requests a management to the device management server. Therefore, the related art device management method has many limitations and problems when the device management client actively and directly requests the management to the device management server.

SUMMARY OF THE INVENTION

Therefore, an object of the present invention is to provide a device management method capable of allowing a device management client to perform device management by actively sending a management request of an object to a device management server.

It is another object of the present invention to provide a device management method capable of determining a desired device management server by using management right information related to a management object, a parent node and a root node when the device management client requests a management of the management object to the device management server.

To achieve these and other advantages and in accordance with the purpose of the present invention, as embodied and broadly described herein, there is provided a device management method in a remote device management system includes: configuring a database with management right information transmitted from one or more device management servers; determining one device management server by using the management right information of the database when a device management request for a specific management object is inputted; sending the device management request to the determined device management server; and processing the device management request in the determined device management server through a session between the device management server and the device management client.

Preferably, the database is updated by management right information transmitted from the device management servers at predetermined time intervals or when the system is changed.

Preferably, the device management client is provided within a mobile communications terminal, and the management right information is an access control list (ACL) indicating a list of device management servers having rights on each command or operation.

Preferably, the device management client determines a desired device management server on the basis of the management right information about each management object or a parent node or a root node.

Preferably, the step for determining the device management server comprises: extracting device management servers having management right on the management object corresponding to the device management request by retrieving the database; setting priorities between the extracted device management servers; and determining a device management server having the highest priority as a device management server, to which the device management request is sent.

Preferably, the step for processing the device management request comprises: performing an authentication procedure of the device management client and checking whether or not the device management server itself can directly process the device management request for the management object; and performing a management session with the device management client if the device management server itself can directly process the device management request.

In one aspect of the present invention, the step for processing the device management request further comprises: notifying the device management client of information of another device management server to process the device management request if the device management server itself cannot directly process; and sending the device management request from the device management client to the notified device management server.

In another aspect of the present invention, the step for processing the device management request further comprises: sending the device management request another device management server if the device management server itself cannot directly process the device management request; and receiving a device management processing result from said another device management server and sending the result to the device management client.

In still another aspect of the present invention, the step for processing the device management request further comprises: sending a failure message to the device management client if the device management server itself cannot directly process the device management request and another device management server to process the device management request does not exist; and determining a device management server having a next priority by the device management client if the failure message is received from the device management server.

Preferably, the device management client determines a device management server which has management right on a parent node of the management object and has never received a request for device management before as a server having the next priority if management right information of the management object is set to null or the management right information is the last management right information. In this case, device management client determines a device management server having the management right on a parents node of the parent node as a server having the next priority if the determined device management server of the next priority has received a request for device management before.

Preferably, the device management client selects a server of the next priority from servers determined according to management rights on the management object itself if the management right information of the management object is not set to null and the management right information is not the last management right information.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Hereinafter, reference will now be made in detail to the preferred embodiments of the present invention, examples of which are illustrated in the accompanying drawings.

In general, a device management specification has an asymmetric shape in a device management system because of property of the device management specification as follows.

First, a device management server always sends a device management command, and a device management client checks management rights of the corresponding device management server and then performs the command.

Second, a detailed method by which the device management client starts a device management session first is not defined.

Third, a detailed method by which the device management client can request device management to the device management server is not defined.

Accordingly, in most cases, the device management client waits until the device management server manages the device management client itself through a device management command or requests device management to the device management server through an out-of-band method such as voice communication with a customer service representative, management request through a web-site or the like.

Table 1 shows definitions of commands defined in a device management technology.

| Command | Definition |
| --- | --- |
| Add | Create a new node beneath a predetermined node |
| Alert | User interface function, multiple message support function, etc. |
| Atomic | Process a plurality of commands by one unit simultaneously at one time |
| Copy | Copy a value of a predetermined node to another node |
| Delete | Delete a predetermined node from a management tree |
| Exec | Execute a process connected to the predetermined node |
| Get | Read a value of a predetermined node |
| Replace | Change a value of a predetermined node |
| Result | Return a value of a corresponding node in response to a Get command |
| Sequence | Execute a plurality of commands according to input order |

Figure 1:
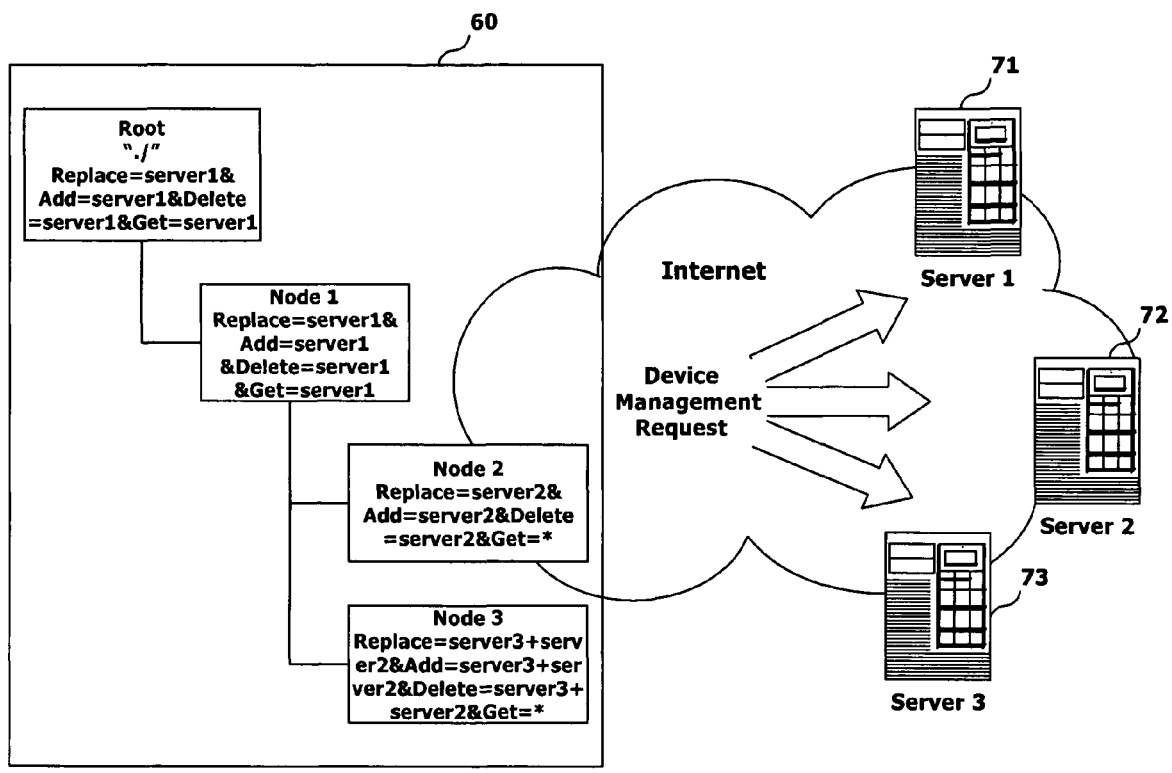
FIG. 1 illustrates one example of a device management system applied to the present invention.

FIG. 1 illustrates a concept that a device management client sends a management request concerning a predetermined management object to a device management server in a device management system.

As illustrated in FIG. 1, a device management system in accordance with the present invention includes a device management client 60 and at least one or more device management servers 71, 72 and 73. The device management client 60 internally includes a device management tree and nodes (management objects) positioned on the device management tree.

The device management client 60 determines a device management server from which device management for a specific management object is requested by using management right information related to the management object or a parent node or a root node.

Preferably, the management right information uses a value of an access control list (ACL). The ACL is an attribute value of a certain management object and has a list of servers having rights on each command and operation. The management right information can be dynamically changed by a specific server during the operation and when a construction of the device management system is changed, can be set to a new value according to the change. That is, the device management servers 71, 72 and 73 transmit their management right information to the device management client 60 at predetermined time intervals or when the system is changed. The device management client 60 configures a database with the management right information transmitted from the device management servers 71, 72 and 73 and then updates the database to a new value in real time.

Figure 2:
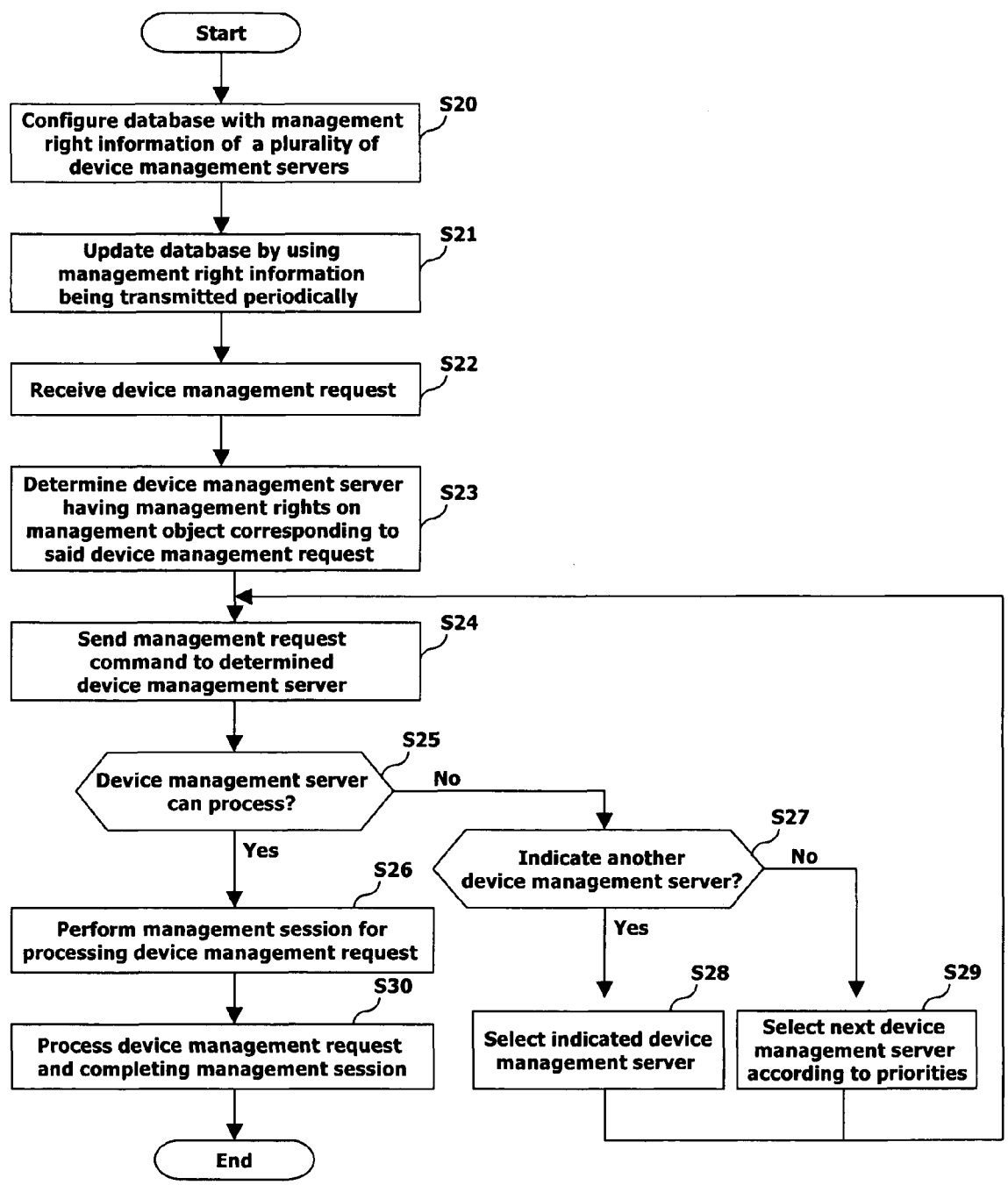
FIG. 2 is a flowchart illustrating a device management method in accordance with the present invention.

FIG. 2 is a flowchart illustrating a device management method in accordance with the present invention.

As illustrated in FIG. 2, a device management client of a terminal configures a database with management right information being transmitted from one or more device management servers (S20). The device management client 60 receives management right information at predetermined time intervals or when the system is changed and updates the management right information in the database to a new value (S21).

Thereafter, if a user inputs a device management request through a user interface (S22), the device management client of the terminal determines one device management server having management rights by using management right information of a management object corresponding to the inputted management request, for example, an ACL (S23). At this time, when a plurality of device management servers having the management right exist, the device management server having the highest priority is selected first.

When one device management sever is determined, the device management client transmits authentication information together with a device management request command to the determined device management server (S24). The device management server having received the device management request command and the authentication information performs an authentication procedure by using the authentication information and determines whether or not the device management server itself can directly process the corresponding device management request (S25).

As a result of such determination, if the device management server itself can process the device management request command, the device management server performs a management session for processing the device management request (S26). On the other hand, when the device management server cannot execute the device management request command, the device management server can notify another device management server capable of processing the requested device management request.

If the device management server notifies another device management server (S27), the device management client determines the notified device management server as a device management server having the management rights on the management object and resends the device management request command and the authentication information to the corresponding server (S28 and S24). However, if the device management server does not identify another device management server but transmits the device management client of a failure of processing the request, the device management client determines a device management server having the next (=second highest) priority and then sends the device management request command and the authentication information to the corresponding server (S29 and S24).

Thereafter, if the device management server checks that the device management is completed and there is no more new request on the basis of a command processing state transmitted from the device management client, the device management server sends a predetermined message to the device management client and completes a device management session between the device management server and the device management client (S30).

Figure 3:
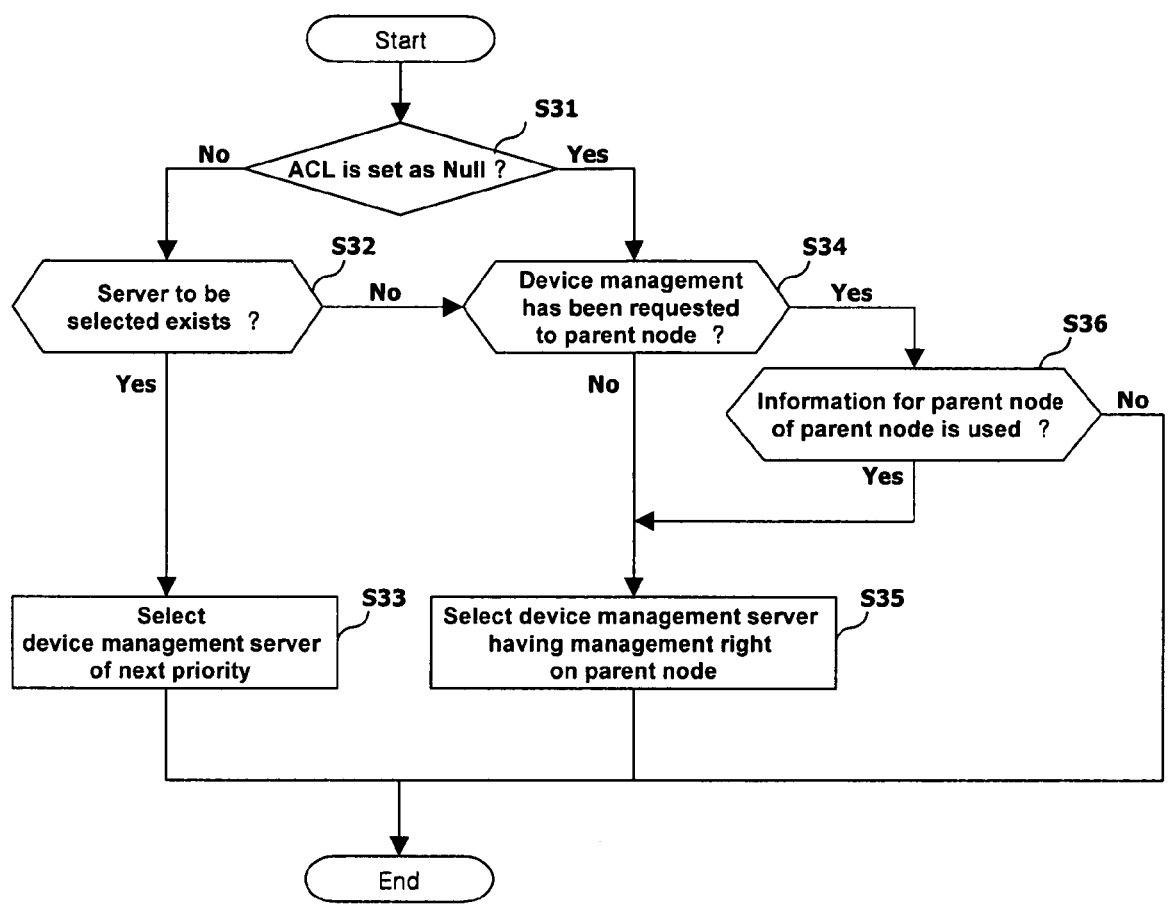
FIG. 3 is a flowchart illustrating a detailed procedure about a process of determining a device management server of the second-highest priority when a device management request fails in FIG. 2.

FIG. 3 is a flowchart illustrating a process in which the device management client determines the device management server having the second highest priority when the management request fails.

For instance, when a management request to a device management server having management rights for a first management object fails, the device management client determines whether or not management right information of the first management object is set to "Null" (S31). If the management right information (=ACL) is not set to Null, the device management client checks whether or not the corresponding management right information is the last one, that is, whether or not a device management server further exists in consideration of priorities (S32).

As a result of such check, when the management right information is not the last one, the device management client selects a server of the second highest priority among servers determined according to management rights with respect to the management object itself (S33). However, when the management right information is the last one (when there is no more device management server) (S32) or when the management right information of the first management object is set to Null, the device management client can determine a device management server having management rights on a parent node of the first management object as a server having the second highest priority.

In this case, the device management server being considered can be selected as the device management server of the second highest priority if the considered device management server has never received a request for device management from the device management client before (S34 and S35). However, if the device management has been already requested to the corresponding device management server, the device management client can select a device management server having management rights on a parent node of the parent node as a server of the second highest priority (S36).

Figure 4:
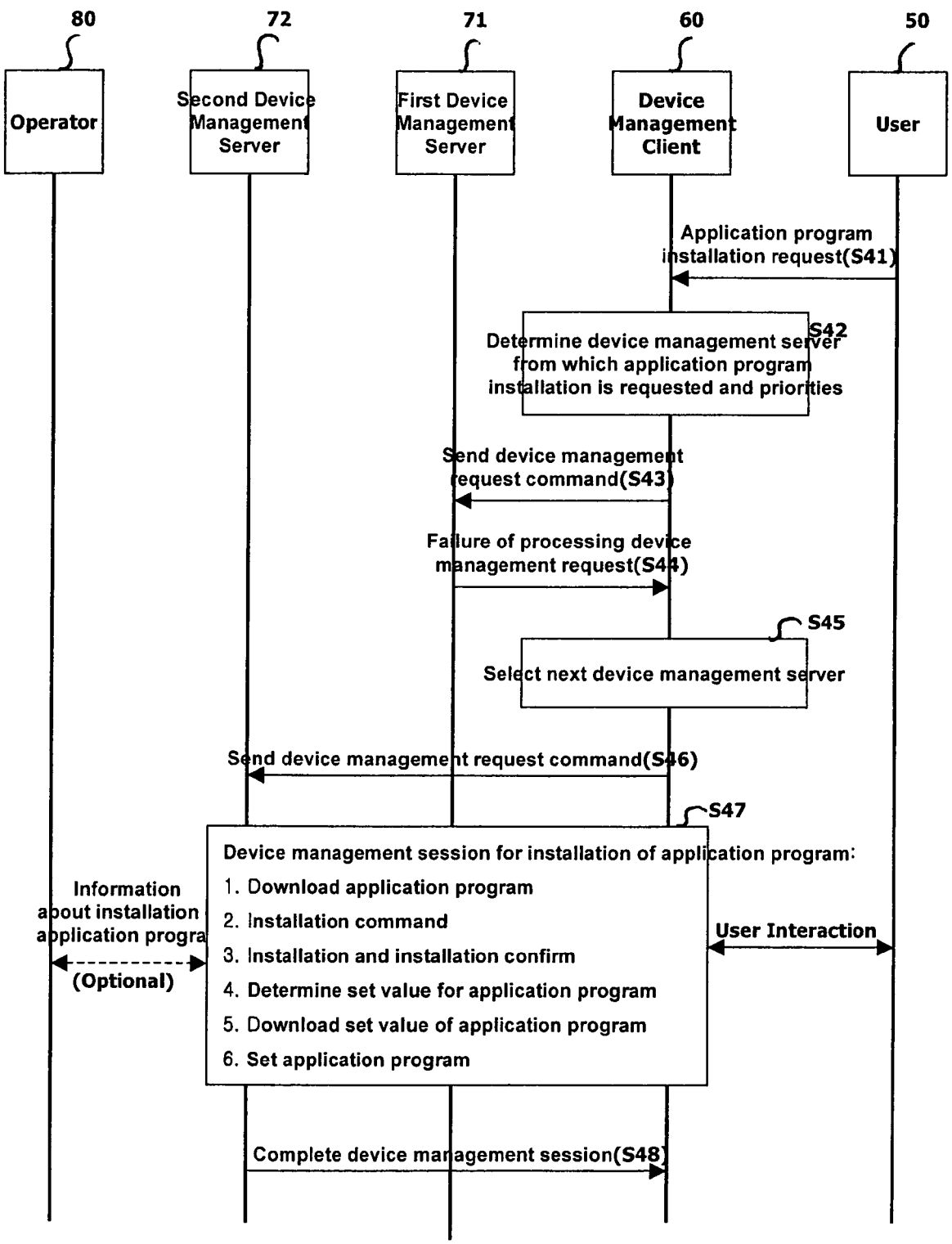
FIG. 4 is a view illustrating an embodiment of the device management method in accordance with the present invention.

FIG. 4 is a view illustrating an embodiment of the device management method in accordance with the present invention, the device management method of when the user downloads a specific application program from a server and installs the downloaded application program in a mobile terminal, and sets according to user's preference and device characteristics.

First, a user 50 does not try a voice communication or connect to a web-site, but directly inputs an application program download request through a user interface mounted in a terminal (S41).

When the application program download request is inputted, the device management client 60 determines a device management server from which installation of an application program is requested by using management right information (=ACL) of a management object corresponding to the application program (S42). At this time, if a plurality of device management servers having management rights on the management object exist, the device management client 60 gives priorities between the device management servers and determines first a device management server having the highest priority as a device management server performing the downloading of the application program.

In this case, the management right information (ACL) about the management object or the parent node or the root node of the management object can be dynamically changed during the operation of the system by a specific device management server, and when a construction of the device management system is changed, can be set to a new value according to the change.

The priorities of the device management servers can be given in various ways. Here, it is assumed that a first device management server 71 has the highest priority.

The device management client 60 extracts connection information for connecting to the first device management server 71 from an internal memory and sends a device management request command or request specification concerning an application program download management object in addition to its own authentication information to the first device management server 71 (S43). The first device management server 71 having received the device management request authenticates the device management client 60 and then determines whether or not the first device management server 71 itself can process the application program installation request transmitted from the device management client 60.

If the application program installation request cannot be processed, the first device management server 71 notifies the device management client 60 that the processing of the device management request failed (S44). At this time, the first device management server 71 can not only notify a processing failure but also help process the application program installation request appropriately by another device management server.

If the device management request failure is notified from the first device management server 71, the device management client 60 selects a device management server having the second highest priority following the first management server 71 (S45) and sends authentication information and a device management request command with respect to an application program management object to the corresponding device management server (S46). In the present embodiment, it is assumed that a second device management server 72 has the second highest priority following the first device management server 71.

The second device management server 72 having received the device management request authenticates the device management client 60 and then determines whether the second device management server 72 itself can process the application program installation request sent from the device management client 60. When the second device management server 72 can process the installation request, the device management server 72 establishes a management session for the application program installation, interworks with the device management client 60 and processes the device management request command concerning the application program management object (S47).

That is, the second device management server 72 performs an authentication procedure of the device management client 60 and then downloads the corresponding application program through a management device session. At this time, the second device management server 72 sends an user interaction command together with a download command to thereby inform type and size of the application program to be downloaded, an object of the downloading or the like and allow to select whether or not to continue the downloading.

The device management client 60 executes the commands and then transmits a result and a state of processing the commands to the second device management server 72. The second device management server 72 having checked the command processing state requests information about hardware construction of the terminal or user's preference from the device management client 60. The device management client 60 transmits the requested information to the second device management server 72.

The second device management server 72 calculates an optimum set value on the basis of the information received from the device management client 60 and transmits the set value to the device management client 60. The device management client 60 having received the set value sets up an environment in which the application program is executed according to the set value and then transmits a command processing state again to the second device management server 72.

In particular, the second device management server 72 checks the management object of the device management request command and transmits information about the installation of the application program to an operator 80. At this time, the transmission of the information to the operator 80 is an option, and can be omitted if the second device management server 72 itself supervises the installation of the application program. If the operator 80 commands an application program download, the second device management server 72 allows the user to determine a kind of the application program to be downloaded and several set values by sending a user interaction command together with the download command. In addition, the second device management server 72 can request specification or a characteristic value of the device for determining a value with respect to an application program setting environment.

Accordingly, the second device management server 72 confirms the command processing state received from the device management client 60 and then sends a predetermined message to the device management client 60, and completes the device management session established between the second device management server 72 and the device management client 60 (S48).

In the step (S42), when determining a server to manage the management object, that is, a device management object, the device management client 60 extracts information about the device management server from the device management server having management rights on the management object or parameters in relation to the device management server. For example, each management object includes attribute information in the form of various parameters in device management specification. Among the parameters, an ACL (Access Control List) parameter includes an ID list of a device management server having management rights of the management object. Accordingly, if an ACL parameter of each management object is checked, the device management sever having the management rights on each management object can be determined. When there are two or more device management server IDs, priorities are determined.

Figure 5:
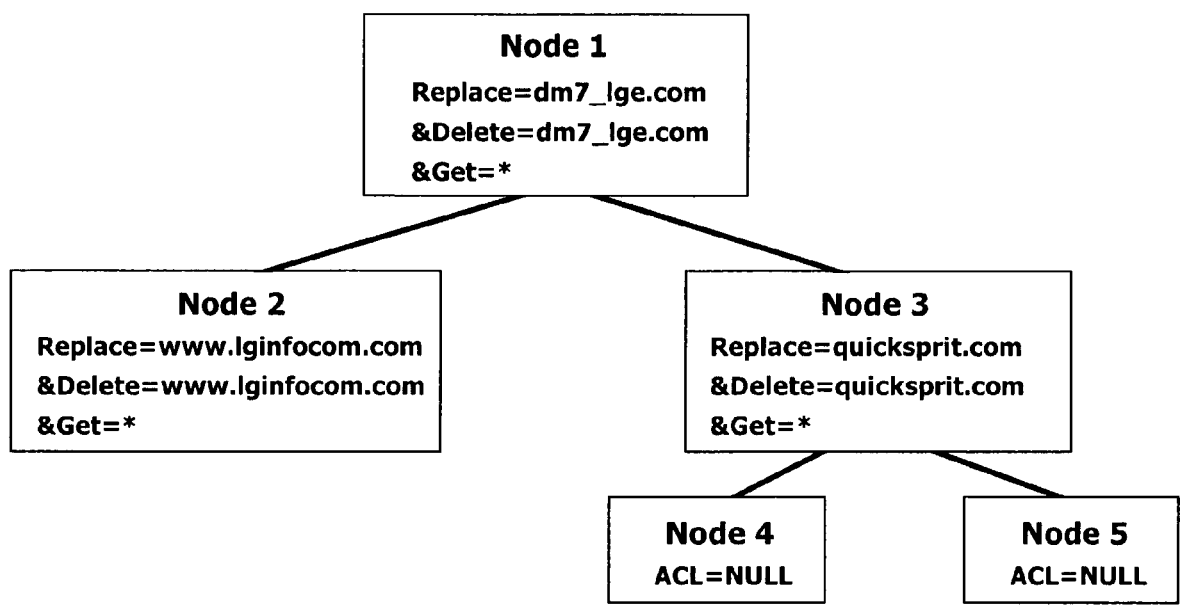
FIG. 5 is a view illustrating one example of a structure of a management tree applied to the present invention.

FIG. 5 is one example of a management tree comprising five nodes (management objects), illustrating an ACL value assigned to each node in the management tree. In this case, dm7_Ige, Iginfocom and quicksprit indicate device management servers, respectively.

If there is no value in an ACL parameter of a management mode such as a fourth node (Node 4) and a fifth node (Node 5), the fourth node (Node 4) and the fifth node (Node 5) can inherit an ACL value of the 3 node (Node 3), a parent node, in accordance with a regulation of the device management specification and priorities between device management servers are determined on the basis of the inherited ACL value.

As one example of a method for giving priorities between the device management servers, the highest priority can be given to a device management server having management rights on a specific command (Exec). At this time, if a plurality of device management servers having management rights on the Exec command exist, higher priorities can be given to the servers listed first in the list, that is, to the servers having management rights on a Replace command. Priorities between a plurality of device management servers are finally determined by such a method.

Accordingly, the device management client sequentially sends management request commands according to the priorities of the device management servers which are determined by the above-described method, and waits for responses from the device management servers. Thereafter, if an approval response to the device management request is received from the device management server, the device management client does not send the device management command any longer but performs a device management session with the device management server having transmitted an approval response.

However, if the approval response to the device management request is not received, the device management client resends the request to the management server having the second highest priority according to the priorities of the management tree or sends a management request to a server having sufficient management rights on a parent node or a root node of the management object. The server having the sufficient management rights on the parent node of the arbitrary management object takes responsibility of processing the management request of the management object. In addition, the device management server having the management rights on the root node, that is, the first node (Node 1), takes responsibility for final processing of the device management request sent from the device management client.

At this time, that the device management server takes responsibility of processing the device management request means that the device management server notifies a client of an ID or an address of another server to process the request when the device management server cannot directly process the request or has another server process the request. In addition, that the device management server takes responsibility for final processing of the device management request means the client must not make a new attempt any longer by using another server when the device management server notifies the client of a processing failure because the device management server cannot directly process the request and cannot notify another server which execute the command.

Figure 6:
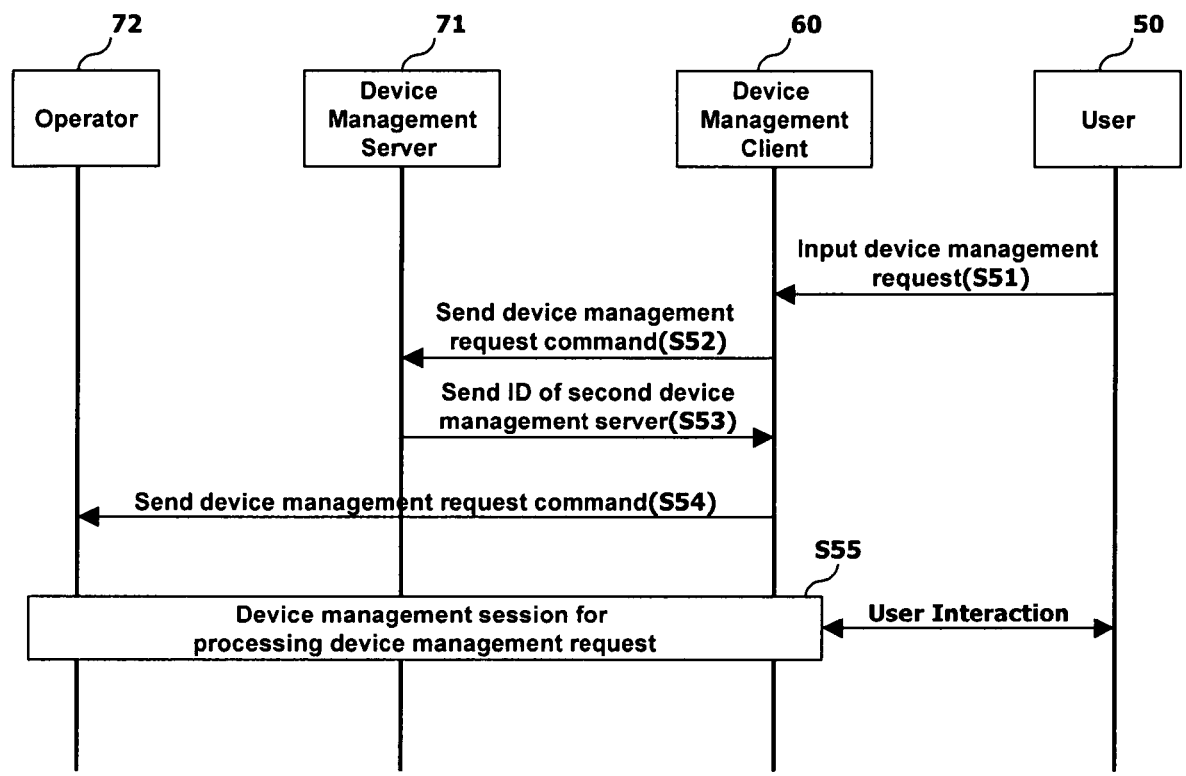
FIG. 6 is a flowchart illustrating a first embodiment in which the device management server processes the device management request in accordance with the present invention.

FIG. 6 is a flowchart illustrating a first embodiment of the device management request processing method of the device management server in the present invention. The first embodiment is a method for notifying a device management client of information about another device management server when the device management server cannot directly process a device management request.

When the user 50 inputs a predetermined device management request through a user interface of a terminal (S51), the device management client 60 of the terminal determines the device management server 71 having management rights on a management object corresponding to the device management object and then sends a device management request (S52). Here, it is assumed that the device management server 71 is a first device management server.

The first device management server 71 checks whether the first device management server 71 itself can directly process the device management request, and when it cannot directly process the request, checks information such as an ID, an address or the like of another device management server which can process the device management request. At this time, it is assumed that another device management server 72 is a second device management server.

The first device management server 71 notifies the device management client 60 of an ID or an address of the second device management server 72 (S53). The device management client 60 resends the device management request to the second device management server 72 (S54).

Accordingly, as described, the second device management server 72 checks authentication of the device management client 60 and then checks whether the second device management server 72 itself can process the device management request sent from the device management client 60. If the processing is possible, the second device management server 72 establishes a device management session with the device management client 60 and performs the device management request (S55). The followed operation is the same as in FIG. 4, and a detailed description therefor will be omitted.

Figure 7:
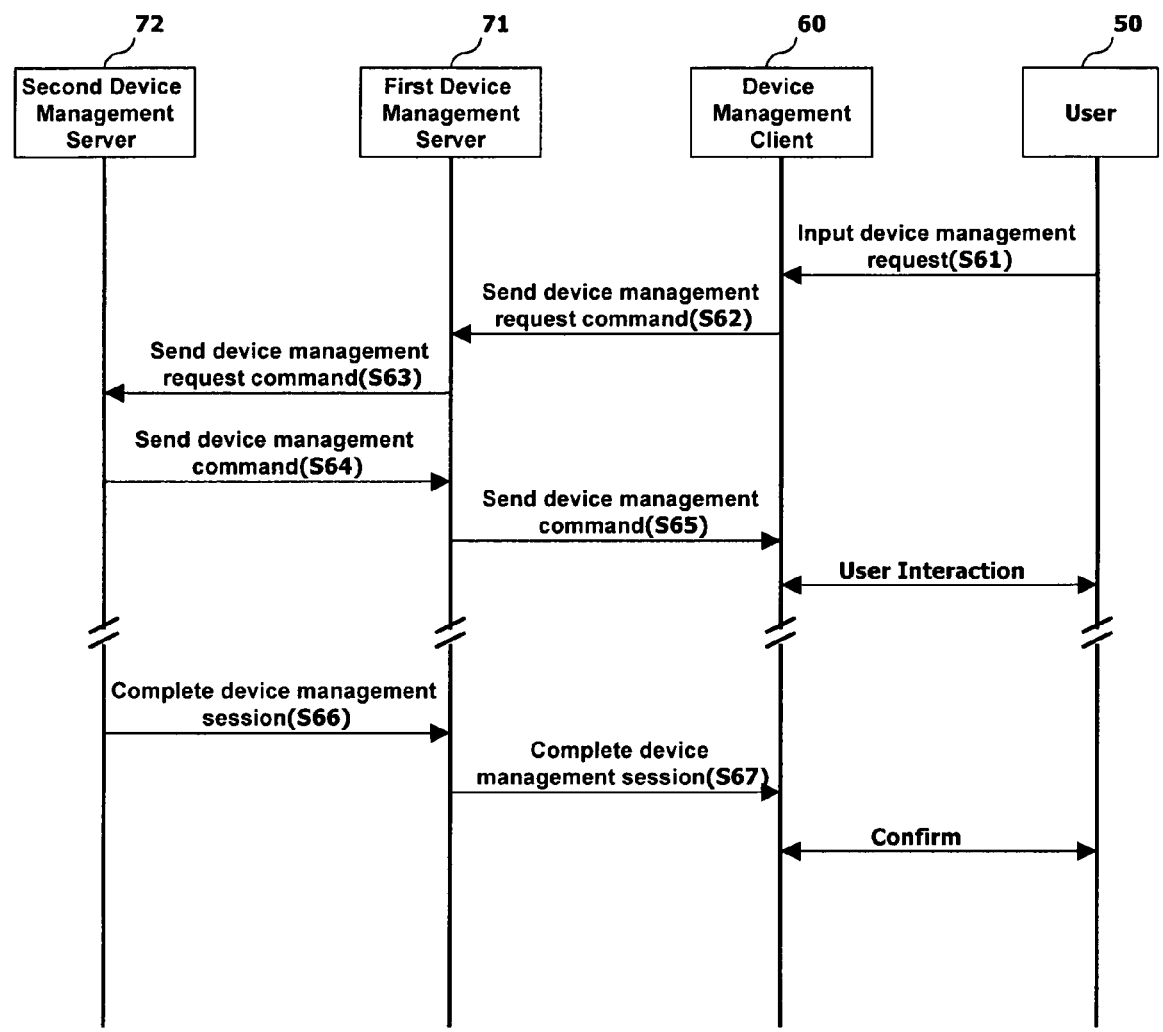
FIG. 7 is a flowchart illustrating a second embodiment in which the device management server processes the device management request in accordance with the present invention.

FIG. 7 is a second embodiment of the device management request processing method of the device management server in the present invention, in which the device management server which has received a device management request but cannot directly process the request serves as a proxy server between another device management server and the device management client.

As shown in FIG. 7, the user 50 inputs a device management request with respect to a predetermined device management object through a user interface of a terminal (S61), the device management client 60 of the terminal sends the device management request to the first device management server 71 (S62).

The first device management server 71 having received the device management request performs an authentication procedure through authentication information of the device management client 60 and then determines whether first device management server 71 itself cannot process the device management request. As a result of such determination, if the first device management server 71 cannot directly process the device management request, the first device management server 71 retrieves another device management server which can process the device management request and then sends the request management request to another device management server 72 (S63). At this time, it is assumed that said another device management server 72 is a second device management server.

The second device management server 72 having received the device management request sent from the first device management server 71 processes the corresponding request and sends a device management command to the first device management server 71 (S64). The first device management server 71 sends the device management command to the device management client 60 (S65).

If the second device management server 72 and the device management client 60 exchange every information through the first device management server 71, the second device management server 72 sends a message for completing a device management session to the first device management server 71 (S66). The first device management server 71 sends the message to the device management client 60(S67), whereby the device management session between the second device management server 72 and the device management client 60 is completed.

If the device management server having received the device management request cannot perform the device management request by directly processing the device management request or by indirectly processing the device management request as described above, the device management server sends the device management client a message informing that the device management request cannot be processed, and completes the device management session.

A device management system and method in accordance with the present invention can be applied when receiving a request for using a rental terminal or a rental device or when extending a term of use. In particular, since a request of a terminal or a device not allowing a voice communication (e.g., a rental notebook, a rental PDA or the like) can be directly received without performing the voice communication, the device management system and method can provide better usage environment to a terminal user.

In addition, in the device management system and method in accordance with the present invention, when errors occur frequently in an operation of a terminal or a device, an error diagnosis and recovery can be directly requested to a device management server through the terminal or the device, a predetermined event occurring in the terminal or the device can be reported to the device management server, and a device management session appropriate for the event can be requested.

As described, in the device management method in accordance with the present invention, a device management client requests, for itself, a device management with respect to an event occurring in a terminal or a device a user operates from a device management server, thereby implementing a variety of device management such as an error detection, QoS and terminal performance supervision, rental terminal management or the like from a user side.

In addition, in the device management system and method in accordance with the present invention, the device management client does not immediately execute or reject a device management command unilaterally sent from a device management server but puts off the device management command, and then is able to request the device management command for itself at a time desired by a user.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for allowing a server to control a mobile terminal that has at least one management object and a client that performs device management, the method comprising:

sending a request to a particular device management server among a plurality of device management servers to initiate a device management procedure for a certain management object, wherein the particular device management server, which can directly process the request, is selected based on server information stored in management objects of the mobile terminal, the server information including a server identifier that identifies the particular device management server that has authority to control the certain management object of the mobile terminal;

receiving a device management command from the particular device management server; and performing the received device management command for the certain management object, wherein the server information is received from the plurality of device management servers periodically or when there is a change in a device management system, wherein the device management procedure is initiated upon opening a device management session with the particular device management server such that receiving the device management command and performing the received device management command are performed, wherein at least sending the request, receiving the device management command or performing the received device management is performed via a proxy server that cooperates with the particular device management server, and wherein the certain management object is part of a device management tree or other logical hierarchy representation having nodes that represent management objects stored in the client of the mobile terminal.

2. The method of claim 1, wherein the server information is based on an access control list that contains information regarding the plurality of device management servers that can be authenticated to perform device management procedures for the certain management object.

3. The method of claim 1, wherein the server information is stored in a database that is updated when necessary.

4. The method of claim 1, further comprising repeating a procedure for selecting a device management server among the plurality of device management servers as necessary until the particular device management server is selected.

5. The method of claim 4, wherein the particular device management server is selected based upon a priority of each of the plurality of device management servers.

6. The method of claim 1, wherein a user of the mobile terminal can download a specific application program from the particular device management server and install the downloaded application program in the mobile terminal as necessary when sending the request, receiving the device management command, and performing the received device management command.

7. A device management method performed by a server, the method comprising:

receiving a request from a device management client that wishes to initiate a device management procedure for a certain management object, wherein the device management client sends the request by selecting a particular device management server, which can directly process the request, from among a plurality of device management servers based on server information stored in management objects of a mobile terminal, the server information including a server identifier that identifies the particular device management server that has authority to control the certain management object of the mobile terminal; and sending a device management command to the device management client which performs the device management command for the certain management object, wherein the server information is sent to the device management client periodically or when there is a change in a device management system, wherein the device management procedure is initiated upon opening a device management session with the device management client such that receiving the request and sending the device management command are performed, wherein receiving the request and sending the device management command are performed via a proxy server, and wherein the certain management object is part of a device management tree or other logical hierarchy representation having nodes that represent management objects stored in the client of the mobile terminal.

* * * * *